US012491649B2

(12) United States Patent
Bozikis

(10) Patent No.: US 12,491,649 B2
(45) Date of Patent: Dec. 9, 2025

(54) SHAVING HEAD WITH INCREASED INTER BLADE SPAN

(71) Applicant: Bic Violex S.A., Anoixi (GR)

(72) Inventor: Ioannis Bozikis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 370 days.

(21) Appl. No.: 17/424,533

(22) PCT Filed: Jan. 29, 2020

(86) PCT No.: PCT/EP2020/052164
§ 371 (c)(1),
(2) Date: Jul. 21, 2021

(87) PCT Pub. No.: WO2020/157130
PCT Pub. Date: Aug. 6, 2020

(65) Prior Publication Data
US 2022/0063119 A1 Mar. 3, 2022

(30) Foreign Application Priority Data
Jan. 31, 2019 (EP) .................................... 19154897

(51) Int. Cl.
*B26B 21/40* (2006.01)
*B26B 21/56* (2006.01)

(52) U.S. Cl.
CPC ........ *B26B 21/4031* (2013.01); *B26B 21/565* (2013.01)

(58) Field of Classification Search
CPC ......... B26B 21/02; B26B 21/04; B26B 21/06; B26B 21/14; B26B 21/16; B26B 21/22;
(Continued)

(56) References Cited

U.S. PATENT DOCUMENTS 4,335,508 A * 6/1982 Francis .................. B26B 21/22
30/47
5,426,851 A * 6/1995 Gilder ................ B26B 21/4031
30/50
(Continued)

FOREIGN PATENT DOCUMENTS

CN 101808784 A 8/2010
CN 102655993 A 9/2012
(Continued)

OTHER PUBLICATIONS

International Search Report and Written Opinion in corresponding Application No. PCT/EP2020/052164, dated Mar. 30, 2020, (15 pages).

*Primary Examiner* — Jason Daniel Prone
(74) *Attorney, Agent, or Firm* — Bookoff McAndrews, PLLC

(57) ABSTRACT

A razor cartridge includes a first blade support and a second blade support. Each of the first and second blade supports include a flat portion having an inner surface which faces away from a shaving surface S. A first blade is attached to the inner surface of the flat portion of the first blade support, the first blade includes a first cutting edge. A second blade attached to the inner surface of the flat portion of the second blade support, the second blade includes a second cutting edge. A distance between the first and second cutting edges is within a range of 1.6 mm to 2.2 mm.

17 Claims, 2 Drawing Sheets

(58) Field of Classification Search
CPC . B26B 21/4031; B26B 21/4068; B26B 21/56; B26B 21/565
USPC .......................................................... 30/47–51
See application file for complete search history.

(56) References Cited

U.S. PATENT DOCUMENTS

| | | | | |
|---|---|---|---|---|
| 6,009,624 | A * | 1/2000 | Apprille, Jr. | B26B 21/4068 30/48 |
| 6,041,926 | A | 3/2000 | Petricca et al. | |
| 6,161,287 | A * | 12/2000 | Swanson | B26B 21/4068 30/47 |
| 6,173,498 | B1 * | 1/2001 | Warrick | B26B 21/227 30/57 |
| 6,212,777 | B1 | 4/2001 | Gilder et al. | |
| 6,216,349 | B1 | 4/2001 | Bernard et al. | |
| 6,295,734 | B1 * | 10/2001 | Gilder | B26B 21/4031 30/50 |
| 6,438,846 | B1 | 8/2002 | Alsaifi | |
| 7,669,335 | B2 | 3/2010 | Walker et al. | |
| 7,681,314 | B2 * | 3/2010 | Follo | B26B 21/222 30/50 |
| 8,117,753 | B2 | 2/2012 | Gilder | |
| 8,225,510 | B2 | 7/2012 | Peterson et al. | |
| 9,032,628 | B2 * | 5/2015 | Hobson, Sr. | B26B 21/565 30/50 |
| 9,718,200 | B2 * | 8/2017 | Dryfhout | B26B 21/22 |
| 9,937,629 | B1 * | 4/2018 | Dryfhout | B26B 21/4031 |
| 10,493,643 | B1 * | 12/2019 | Dryfhout | B26B 21/4031 |
| 10,780,595 | B2 * | 9/2020 | Lin | B26B 21/565 |
| 10,780,598 | B2 | 9/2020 | Park et al. | |
| 10,786,914 | B2 * | 9/2020 | Galanis | B26B 21/4068 |
| 10,981,286 | B2 * | 4/2021 | Efthimiadis | B26B 21/565 |
| 11,000,960 | B1 | 5/2021 | Hooberman | |
| 11,059,193 | B2 * | 7/2021 | Bozikis | B26B 21/4031 |
| 11,220,014 | B2 * | 1/2022 | Kim | B26B 21/4031 |
| 11,318,632 | B2 * | 5/2022 | Efthimiadis | B26B 21/565 |
| 11,691,306 | B2 * | 7/2023 | Bozikis | B26B 21/565 30/50 |
| 2005/0015991 | A1 | 1/2005 | Follo et al. | |
| 2005/0198825 | A1 | 9/2005 | Apprille | |
| 2005/0198837 | A1 | 9/2005 | Rawle | |
| 2006/0277759 | A1 | 12/2006 | Follo | |
| 2007/0193042 | A1 | 8/2007 | Worrick et al. | |
| 2009/0083982 | A1 | 4/2009 | Forsdike | |
| 2010/0077617 | A1 | 4/2010 | Peterson et al. | |
| 2010/0175265 | A1 | 7/2010 | Bozikis et al. | |
| 2010/0218381 | A1 | 9/2010 | Follo | |
| 2010/0269351 | A1 | 10/2010 | Gilder et al. | |
| 2011/0146079 | A1 | 6/2011 | Clarke et al. | |
| 2011/0162208 | A1 | 7/2011 | Wain | |
| 2011/0289779 | A1 * | 12/2011 | Volodin | B26B 21/565 30/50 |
| 2013/0180117 | A1 | 7/2013 | Hobson, Sr. et al. | |
| 2014/0026424 | A1 | 1/2014 | Oglesby et al. | |
| 2014/0259677 | A1 | 9/2014 | Coresh | |
| 2015/0101195 | A1 | 4/2015 | Long et al. | |
| 2015/0217468 | A1 | 8/2015 | Dryfhout et al. | |
| 2016/0040803 | A1 | 2/2016 | Steeger et al. | |
| 2016/0167242 | A1 | 6/2016 | Noh et al. | |
| 2017/0057106 | A1 | 3/2017 | Worrick, III | |
| 2018/0001492 | A1 | 1/2018 | Nicholas | |
| 2018/0071930 | A1 | 3/2018 | Walker, Jr. et al. | |
| 2019/0016001 | A1 * | 1/2019 | Zucker | B26B 21/4031 |
| 2019/0061184 | A1 | 2/2019 | Lin et al. | |
| 2019/0168402 | A1 | 6/2019 | Efthimiadis et al. | |
| 2019/0224874 | A1 * | 7/2019 | Blatter | B26B 21/4031 |
| 2019/0255720 | A1 | 8/2019 | Galanis et al. | |
| 2020/0031005 | A1 | 1/2020 | Kim et al. | |
| 2020/0031006 | A1 | 1/2020 | Kim et al. | |
| 2020/0316801 | A1 | 10/2020 | Efthimiadis et al. | |
| 2021/0031389 | A1 | 2/2021 | Bozikis et al. | |
| 2021/0146561 | A1 | 5/2021 | Bozikis et al. | |
| 2021/0370534 | A1 | 12/2021 | Bozikis | |
| 2022/0118635 | A1 * | 4/2022 | Bozikis | B26B 21/4031 |
| 2022/0152853 | A1 * | 5/2022 | Moustakas | B26B 21/4031 |
| 2022/0234228 | A1 * | 7/2022 | Zografos | B26B 21/4031 |
| 2022/0314476 | A1 * | 10/2022 | Zografos | B26B 21/565 |
| 2022/0314477 | A1 * | 10/2022 | Galanis | B26B 21/565 |
| 2022/0314478 | A1 * | 10/2022 | Galanis | B26B 21/4031 |
| 2023/0035264 | A1 * | 2/2023 | Polygerinos | B26B 21/4031 |

FOREIGN PATENT DOCUMENTS

| | | | | |
|---|---|---|---|---|
| CN | 103180110 | A | 6/2013 | |
| CN | 105358294 | A | 2/2016 | |
| CN | 109153140 | A | 1/2019 | |
| EP | 2823942 | A1 | 1/2015 | |
| EP | 2731759 | B1 | 12/2015 | |
| EP | 2707180 | B1 | 12/2016 | |
| EP | 3357653 | A1 | 8/2018 | |
| JP | H09502912 | A | 3/1997 | |
| JP | 2003024121 | A | 1/2003 | |
| JP | 2003510142 | A | 3/2003 | |
| JP | 2013514145 | A | 4/2013 | |
| JP | 2013099467 | A | 5/2013 | |
| JP | 5719755 | B2 | 5/2015 | |
| JP | 2017514654 | A | 6/2017 | |
| WO | 9509071 | A1 | 4/1995 | |
| WO | 2006027018 | A1 | 3/2006 | |
| WO | WO-2007147420 | A1 * | 12/2007 | B26B 21/227 |
| WO | 2008023210 | A1 | 2/2008 | |
| WO | 2011092891 | A1 | 8/2011 | |
| WO | 2012158141 | A1 | 11/2012 | |
| WO | 2016007329 | A1 | 1/2016 | |

* cited by examiner

[Fig. 1]
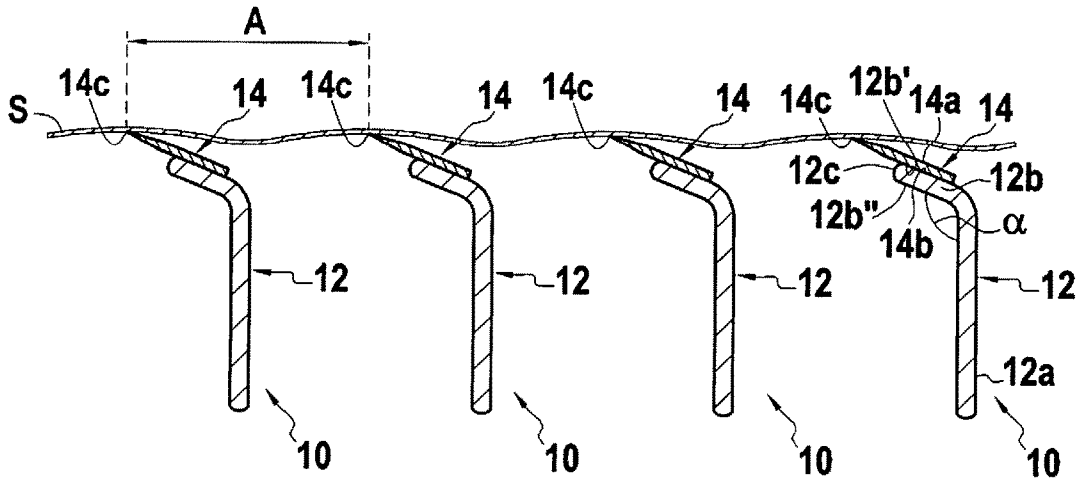
PRIOR ART
[Fig. 2]
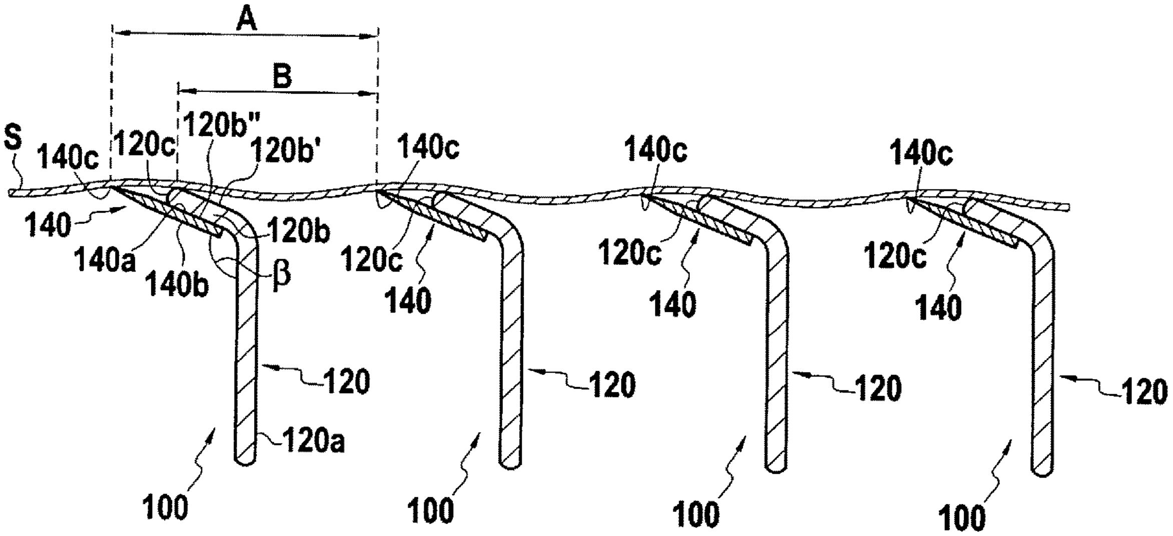

[Fig. 3A]
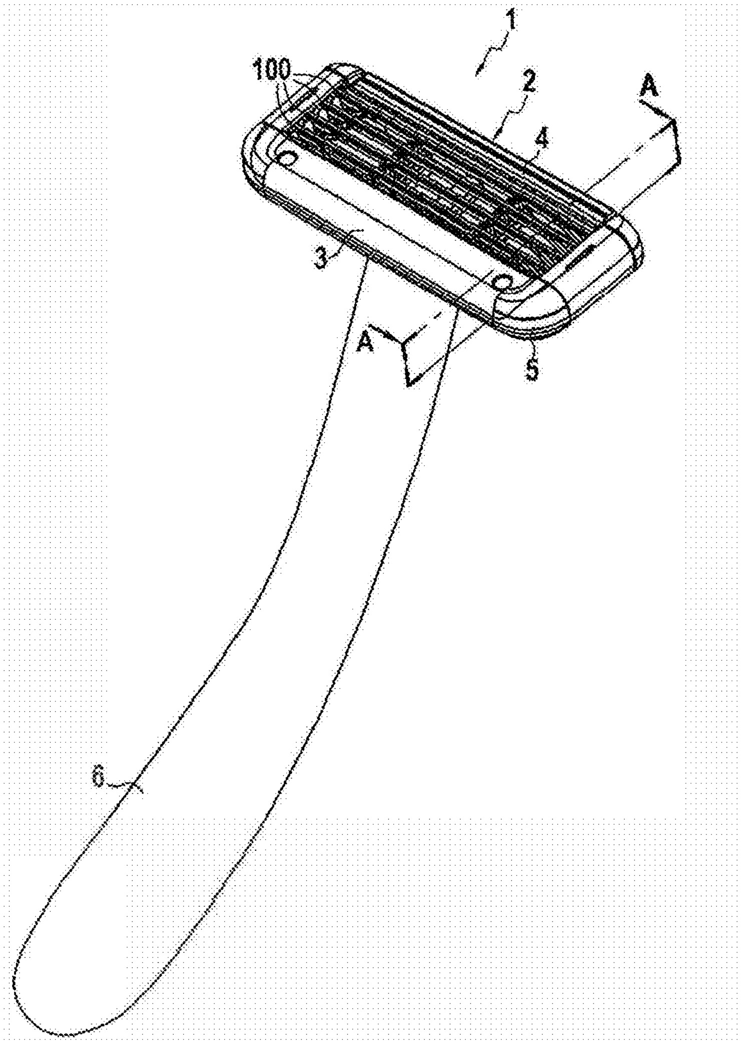
[Fig. 3B]
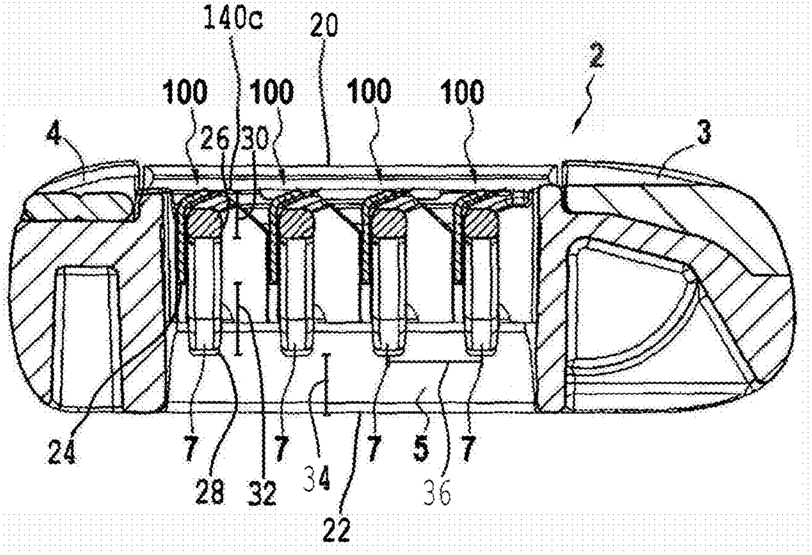

SHAVING HEAD WITH INCREASED INTER BLADE SPAN

CROSS-REFERENCE TO RELATED APPLICATIONS

This application is a National Stage Application of International Application No. PCT/EP2020/052164, filed on Jan. 29, 2020, now published as WO/2020/157130, and which claims priority to European Patent Application No. EP 19154897.3, filed on Jan. 31, 2019, the entire contents of which are incorporated herein by reference.

BACKGROUND

1. Field

The following description relates to razor cartridges for shaving devices, and more particularly to a razor cartridge having at least two blade assemblies that allow for an increase in the inter-blade span (IBS) of consecutive blade assemblies.

2. Description of Related Art

Shaving devices generally include a head unit having at least one or more cutting members or blades retained therein. The at least one or more cutting members or blades have cutting edges that are aligned in parallel when retained within the head unit.

Conventional shaving heads include a blade mounted on the upper surface of a blade support. The upper surface being understood as flat portion of the blade support which in use faces the shaving surface. To avoid nicks and cuts using these configurations it is known to bring blade assemblies closer to each other. This also reduces the sense of irritation and enhances the glideness experience of the user during shaving. Document U.S. Pat. No. 8,117,753 discloses shaving heads having average inter-blade span not greater than 1.25 mm.

However, an inter-blade span smaller than 1.25 mm is a relatively small inter-blade span involving relatively small space available for water and shaving debris to flow between the cutting members and out of the razor (and shaving surface), i.e., rinsability.

Prior attempts to decrease undesirable skin irritation while also improve rinsability include:

1) inter-blade guards that act as skin guards. The inter-blade guards provide a rinse-through gap across the length of the blades to alleviate the constricting spaces between blades. The use of inter-blade guards which act as skin guards assists with rinsability and skin stretching to prevent skin bulging;
2) metallic spacers formed above the surface of the blade, defining a skin engaging cap portion; and/or
3) ink objects, printed on the razor blade, which act as skin guards.

SUMMARY

The present disclosure provides a razor cartridge comprising two or more blade assemblies. The razor cartridge comprises a first blade support and a second blade support. Each of the first and second blade supports include a flat portion having an inner surface which in use faces away from a shaving surface. A first blade is provided attached to the inner surface of the flat portion of the first blade support, wherein the first blade includes a first cutting edge. A second blade is provided attached to the inner surface of the flat portion of the second blade support, wherein the second blade includes a second cutting edge. A distance between the first and second cutting edges is within a range of 1.6 mm to 2.2 mm and within the distance between the first and the second cutting edges, the first blade support is the only portion of the razor cartridge extending to contact the shaving surface during use.

The distance between the first and second cutting edges may be within a range of 1.70 mm to 2 mm.

The distance between the first and second cutting edges may be within a range of 1.75 to 1.95 mm.

Each of the first and second blade support may include a front end configured to contact skin.

At least one front end may be rounded.

Each of the first and second blade support may include a base portion extending at an angle β from the flat portion, the angle β may be formed between the flat portion and the base portion of the respective first and second blade supports may be within a range of 104° to 120°.

The razor cartridge may further comprise a third blade support. The third blade support may include a flat portion having an inner surface which faces away from the shaving surface S. A third blade may be attached to the inner surface of the flat portion of the third blade support. The third blade may include a third cutting edge. A distance between the second to the third cutting edges may be within a range of 1.6 mm to 2.2 mm, and within the distance between the second and the third cutting edges, the second blade support is the only portion of the razor cartridge extending to contact the shaving surface during use.

The distance between the second to the third cutting edges may be within a range of 1.70 mm to 2 mm.

The distance between the second to the third cutting edges may be within a range of 1.75 mm to 1.95 mm.

The razor cartridge may further comprise a fourth blade support. The fourth blade support may include a flat portion having an inner surface which faces away from the shaving surface S. A fourth blade may be attached to the inner surface of the flat portion of the fourth blade support. The fourth blade may include a fourth cutting edge. A distance between the third to the fourth cutting edges may be within a range of 1.6 mm to 2.2 mm, and within the distance between the third and the fourth cutting edges, the third blade support is the only portion of the razor cartridge extending to contact the shaving surface during use.

The distance between the third to the fourth cutting edges may be within a range of 1.70 mm to 2 mm.

The distance between the third to the fourth cutting edges may be within a range of 1.75 to 1.95 mm.

The third and/or fourth blade supports may include a front end that may be configured to contact skin.

At least one front end may be rounded.

A shaver comprising a handle and the aforementioned razor cartridge. The razor cartridge being connectable to the handle. The razor cartridge comprises four blade assemblies, the distance between consecutive cutting edges is 1.85 mm±0.1 mm, and within the distance between consecutive cutting edges, the blade support is the only portion of the razor cartridge extending to contact the shaving surface during use.

An aspect of having a razor cartridge in which the blades are mounted on the inner surface of the blade support, i.e. on the surface that in use faces away from the shaving surface is that during shaving, the skin is supported by the blade cutting edges and by the blade support ends. This provides for additional skin contacting points, where traditionally only the cutting edges where skin contacting points. The skin contacting points are now doubled thereby allowing for the inter-blade span (IBS) to be increased at the same time as the skin remains supported by the additional skin contacting points. Since the skin is additionally supported by the blade support ends, the possibility of the skin to create a bulge in between two consecutive blade cutting edges ("bulging effect") even with increased IBS is reduced thereby also reducing nicks and cuts.

Further, by increasing the IBS, and therefore the opening or spacing between the blades, effective removal of the shaving debris during the shaving experience is achieved. This leads to less need for rinsing the shaver during a shaving experience as the increased IBS allows for a continuous flow of water, shaving debris, shaving foam thereby reducing the occurrence of clogging. This improves the overall shaving experience because the shaving debris can now flow easily through the larger opening (IBS) during the shaving experience. In addition, a user may not need to agitate or even bang the shaver (against the sink) to dislodge debris during rinsing. This extends lifetime of the shavers, particularly as banging of the shaver to dislodge debris may in circumstances undesirably change blade exposure.

BRIEF DESCRIPTION OF THE DRAWINGS

FIG. 1 details a side view of a plurality of blade assemblies of a conventional razor having the blades mounted on the upper surface of the blade support.

FIG. 2 details a side view of a plurality of blade assemblies having the blades mounted on the lower surface of the blade support.

FIG. 3A details a perspective view of a shaver including a handle and a razor cartridge including the plurality of blade assemblies of FIG. 2.

FIG. 3B details a cross-section of the razor cartridge of FIG. 3A along plane A.

DETAILED DESCRIPTION

FIG. 1 shows a plurality of conventional blade assemblies, each blade assembly 10 includes a blade support 12 and a blade 14. Each of the plurality of conventional blade assemblies are configured to be assembled into a razor cartridge (not shown).

The blade support 12 may include a base portion 12*a* and a flat portion 12*b*. The flat portion 12*b* may have a front end 12*c*. The flat portion 12*b* may extend at an angle α relative to the base portion 12*a*. The flat portion 12*b* may have an upper surface 12*b*' facing a shaving surface S when in use and a lower surface 12*b*" opposite the upper surface 12*b*'.

The blade 14 may include an upper surface 14*a* also facing the shaving surface S, a lower surface 14*b* opposite the upper surface 14*a*, and a cutting edge 14*c*. The lower surface 14*b* of the blade 14 may be attached to the upper surface 12*b*' of the blade support 12.

As can be seen in the example shown in FIG. 1, the only point of contact with the shaving surface S, which is skin in this example, is the cutting edges 14*c*. This configuration can thus place excess blade pressure on the skin, which can lead to nicks and cuts. As such, in conventional shavers, a distance A between adjoining blade assemblies (IBS) is known to be smaller than 1.25 mm so that the blade pressure on the skin is spread out over a larger surface area.

Shown in FIG. 2 is a plurality of blade assemblies, each blade assembly 100 includes a blade support 120 and blade 140. In the example shown in FIG. 2 four blade assemblies 100 are shown. In examples, other number of blade assemblies may be foreseen as long as there are two consecutive ones to establish the herein disclosed distance between two consecutive blade cutting edges (IBS).

The blade support 120 may include a base portion 120*a* and a flat portion 120*b*. The flat portion 120*b* may extend at an angle β relative to the base portion 120*a*. The angle between the flat portion 120*b* and the base portion 120*a* may be, for example, between 104° to 120°. The flat portion 120*b* may have an upper surface 120*b*' facing the shaving surface S when in use and a lower surface 120*b*" opposite the upper surface 120*b*'. The lower surface 120" may thus face away from the shaving surface S when in use. Briefly referring to FIG. 3B, the blade support 120 also comprises an inner end 24 opposed to the flat portion 120*b*.

The blade 140 may include an upper surface 140*a*, a lower surface 140*b* opposite the upper surface 140*a*, and a cutting edge 140*c*. The upper surface 140*a* of the blade 140 may be attached to the lower surface 120*b*" of the blade support 120. The blade may have a thickness between 0.04-0.12 mm.

The flat portion 120*b* of the blade support 120 may have a front end 120*c*. As can be seen in the example shown in FIG. 2, the front end 120*c* and the blade cutting edge 140*c* both act as contact points with the shaving surface S, e.g. the skin. This configuration spreads the blade pressure over a larger surface area of the skin, which reduces the blade pressure on the skin thereby reducing irritation. Put in other words, this contributes to further smoothening skin contacting during shaving. Also the fact that there are additional skin (shaving surface) contacting points helps following the contour of the skin/shaving surface thereby reducing the well-known bulging effect, i.e. the possibility of the skin to be bulged in between consecutive blade cutting edges during shaving. This reduces nicks and cuts.

Furthermore, this configuration allows for an increase in the IBS, i.e. the distance A between consecutive cutting edges of adjoining blade assemblies 100. With the above described configuration, the distance A (IBS) may be between 1.6 mm to 2.2 mm, more specifically from 1.70 mm to 2 mm and most specifically from 1.75 to 1.95. In an example, the IBS may be 1.85 mm±0.1 mm. This means that pressure on skin is reduced at the same time as the cartridge is less prone to clogging therefore rinsing necessity is reduced.

The front end 120*c* may be flat or rounded. An aspect of having a rounded front end 120*c* is that it further increases the sliding of the blade assembly on the skin (shaving surface). This further contributes to improve glideness.

Also shown in FIG. 2 is a distance B, which is the distance between the cutting edge 140*c* and the front end 120*c* of the adjoining blade support 120. With the configuration of the present disclosure, distance B may be between the range of 1.2 mm to 1.8 mm.

Shown in FIG. 3A is a shaver 1 including a handle 6 and a razor cartridge 2 including the plurality of blade assemblies 100 substantially as disclosed herein mounted in a head unit 5. Due to the IBS of conventional razors, it is common for the head unit to include five blade assemblies therein. However, with the present disclosure, it is possible to provide a razor cartridge 2 that includes four blade assemblies 100 enclosed within the same head unit 5 that traditionally included five blades. This can reduce the cost of razor cartridges 2 while performance is at least maintained or even improved. Furthermore, this blade assembly 100 may be incorporated into existing standard head units 5, thus a manufacturer does not need to make major changes to their existing manufacturing process, therefore reducing the costs associated with a change over.

Shown in FIGS. 3A and 3B is an exemplary razor cartridge 2 including a shaving head unit 5 having four movable shaving blade assemblies 100. In examples, it is envisioned that any suitable number of blades may be used, for example two or more blades. In examples, the shaving blade assemblies 100 may be fixed blades. Including blade assemblies, e.g. four shaving blade assemblies 100, expedites the shaving experience as well as extends the life of the razor head.

The razor cartridge 1 may have a guard bar 3 and a rear cap 4. In examples, the razor cartridge 1 may not include the guard bar 3 and/or rear cap 4.

In the shaving direction, the guard bar 3 is shown in front of the blade assemblies 100 and the rear cap 4 is provided behind the blade assemblies 100.

As aforementioned, the razor cartridge 2 includes four resilient elements 7 (for example spring fingers) elastically biasing each blade assembly 100 towards a rest position. In examples where the razor cartridge 2 includes a different number of blade assemblies 100, a corresponding number of resilient elements 7 may be foreseen. Accordingly, the blade assemblies 100 may be movable under forces encountered during shaving. The resilient elements 7 may be molded as a single piece with the head unit 5. Furthermore, the resilient elements have a first end 26 and a second end 28.

In some examples, the razor cartridge 2 may include fixed blade assemblies 100 that may not have resilient elements 7.

In further examples, the razor cartridge 2 comprises a skin facing side 20 and an opposed side 22, wherein the skin facing side 20 faces the skin and the opposed side 22 faces the opposite direction to the skin facing side 20.

In other examples, the razor cartridge 2 comprises a first distance 30 defined as the distance between an inner side of the first end of the resilient elements 26 and the cutting edge 140c. The razor cartridge 2 further comprises a second distance 32 defined as the distance between the second end of the resilient elements 28 and the inner end 24. In some examples, the second distance 32 is greater than the first distance 30.

In some other examples, the razor cartridge 2 comprises a resilient element distance 36, which is the distance between adjacent resilient elements 7 (e.g., the first resilient element 7 to the second resilient element 7, the second resilient element 7 to the third resilient element 7, etc.). The razor cartridge 2 further comprises a resilient element to opposed side distance 34, which is the distance between resilient elements 7 and the opposed side 22. In some examples, the resilient element distance 36 is greater than the resilient element to opposed side distance 34.

It has been found that a razor cartridge 2 including four movable blade assemblies, as shown in the example of FIG. 3B, wherein the IBS between each consecutive cutting edge is 1.85 mm±0.1 mm and the blade is mounted in the lower surface of the blade support, the pressure applied to the skin of a user during shaving by the cutting edges 140c is about 10 times lower than a pressure exerted by conventional razor cartridges five movable blades with the cutting edge mounted on the upper surface of the blade support and the IBS being of about 1.0-1.4 mm.

Further, it has been found that a razor cartridge 2 including four movable blade assemblies, as shown in the example of FIG. 3B, wherein the IBS between each consecutive cutting edge is 1.85 mm±0.1 mm and wherein the blade is mounted in the lower surface of the blade support, the pressure applied to the skin of a user during shaving by the cutting edges 140c is of about 10 times lower than a pressure exerted by razor cartridges with four movable blades with the cutting edge mounted on the upper surface of the blade support and the IBS being of about 1.85±0.1 mm. Such a reduction in the pressure applied to the skin of a user during shaving is also accompanied by the increased flow of debris and water and shaving foam due to the increased IBS.

The invention claimed is:

1. A razor cartridge having a skin facing side and an opposed side, comprising:

a first blade support and a second blade support, each of the first blade support and the second blade support includes a flat portion having an inner surface which in use faces away from a shaving surface and an inner end opposed to the flat portion;

a first resilient element and a second resilient element elastically biasing the first blade support and the second blade support, respectively, to a rest position, each of the first resilient element and the second resilient element having a first end and a second end, wherein the first resilient element and the second resilient element comprise a single piece;

a first blade attached to the inner surface of the flat portion of the first blade support, wherein the first blade includes a first cutting edge;

a second blade attached to the inner surface of the flat portion of the second blade support, wherein the second blade includes a second cutting edge, and wherein the first cutting edge and the second cutting edge are configured to contact the shaving surface;

wherein a first distance is the distance between an inner side of the first end of the first resilient element to the first cutting edge, wherein a second distance is the distance between the second end of the first resilient element to the inner end of the first blade support, wherein the second distance is greater than the first distance;

wherein a third distance between the first and second cutting edges is within a range of 1.6 mm to 2.2 mm, wherein within the third distance between the first and the second cutting edges, the first blade support, excluding the first blade, is the only portion of the razor cartridge configured to contact the shaving surface during use;

a third blade support, the third blade support including a flat portion having an inner surface which in use faces away from the shaving surface;

a third blade attached to the inner surface of the flat portion of the third blade support, wherein the third blade includes a third cutting edge;

wherein a fourth distance between the second to the third cutting edges is within a range of 1.6 mm to 2.2 mm, wherein within the fourth distance between the second and the third cutting edges, the second blade support, excluding the second blade, is the only portion of the razor cartridge configured to contact the shaving surface during use;

wherein the first resilient element is entirely between the first blade support and the second blade support, and the second resilient element is entirely between the second blade support and the third blade support;

a fourth blade support, the fourth blade support including a flat portion having an inner surface which in use faces away from the shaving surface; and a fourth blade attached to the inner surface of the flat portion of the fourth blade support, wherein the fourth blade includes a fourth cutting edge, wherein a fifth distance between the third to the fourth cutting edges is within a range of 1.6 mm to 2.2 mm, wherein within the fifth distance between the third and the fourth cutting edges, the third blade support, excluding the third blade, is the only portion of the razor cartridge configured to contact the shaving surface during use.

2. The razor cartridge of claim 1, wherein the range of the third distance is 1.70 mm to 2 mm.

3. The razor cartridge of claim 1, wherein the range of the third distance is 1.75 mm to 1.95 mm.

4. The razor cartridge of claim 1, wherein each of the first and second blade support includes a front end configured to contact the shaving surface.

5. The razor cartridge of claim 4, wherein at least one of the front ends is rounded.

6. The razor cartridge of claim 1, wherein each of the first and second blade support includes a base portion extending at an angle β from the flat portion, the angle β formed between the flat portion and the base portion of the respective first and second blade supports being within a range of 104° to 120°.

7. The razor cartridge of claim 1, wherein the range of the fourth distance is 1.70 mm to 2 mm.

8. The razor cartridge of claim 1, wherein the range of the fourth distance is 1.75 mm to 1.95 mm.

9. The razor cartridge of claim 1, wherein the range of the fifth distance is 1.70 mm to 2 mm.

10. The razor cartridge of claim 1, wherein the range of the fifth distance is 1.75 to 1.95 mm.

11. The razor cartridge of claim 1, wherein the third blade support and/or the fourth blade support include a front end that is configured to contact skin.

12. The razor cartridge of claim 11, wherein the front end of the third blade support and/or the fourth blade support is rounded.

13. The razor cartridge of claim 1, wherein the third distance is 1.85 mm±0.1 mm, the fourth distance is 1.85 mm±0.1 mm, and the fifth distance is 1.85 mm±0.1 mm.

14. The razor cartridge of claim 1, wherein a resilient element distance is the distance between the first resilient element and the second resilient element, wherein a resilient element to opposed side distance is the distance between the first resilient element and the opposed side, and wherein the resilient element distance is greater than the resilient element to opposed side distance.

15. A shaver comprising a handle and the razor cartridge according to claim 1, the razor cartridge being connectable to the handle.

16. A razor cartridge having a skin facing side and an opposed side, comprising:

a first blade support and a second blade support, each of the first blade support and the second blade support includes a round front end and a flat portion having an inner surface which in use faces away from a shaving surface and an inner end opposed to the flat portion;

a first resilient element and a second resilient element elastically biasing the first blade support and the second blade support, respectively, to a rest position, wherein the first resilient element has a first end and a second end, and wherein the first resilient element and the second resilient element comprise a single piece;

a first blade attached to the inner surface of the flat portion of the first blade support, wherein the first blade includes a first cutting edge; and a second blade attached to the inner surface of the flat portion of the second blade support, wherein the second blade includes a second cutting edge, wherein a first distance is the distance between an inner side of the first end of the first resilient element to the first cutting edge, wherein a second distance is the distance between the second end of the first resilient element to the inner end of the first blade support, wherein the second distance is greater than the first distance;

wherein the first cutting edge and the second cutting edge are configured to engage the shaving surface, and at least a portion of the round front ends are configured to engage the shaving surface, wherein a third distance between the first and second cutting edges is within a range of 1.6 mm to 2.2 mm, wherein within the distance between the first and the second cutting edges, the first blade support, excluding the first blade, is the only portion of the razor cartridge configured to engage the shaving surface during use, and wherein a fourth distance between the second cutting edge and the round front end of the first blade support is in a range from 1.2 mm to 1.8 mm.

17. The razor cartridge of claim 16, wherein a resilient element distance is the distance between the first resilient element and the second resilient element, wherein a resilient element to opposed side distance is the distance between the first resilient element and the opposed side, and wherein the resilient element distance is greater than the resilient element to opposed side distance.

* * * * *